No. 800,736. PATENTED OCT. 3, 1905.
A. L. GOODKNIGHT.
AIR BRAKE MECHANISM.
APPLICATION FILED FEB. 1, 1905.

Witnesses  Alva L. Goodknight, Inventor
by C. A. Snow & Co.
Attorneys

No. 800,736. PATENTED OCT. 3, 1905.
A. L. GOODKNIGHT.
AIR BRAKE MECHANISM.
APPLICATION FILED FEB. 1, 1905.

Alva L. Goodknight, Inventor

Witnesses by C. A. Snow & Co., Attorneys

No. 800,736.

PATENTED OCT. 3, 1905.

A. L. GOODKNIGHT.
AIR BRAKE MECHANISM.
APPLICATION FILED FEB. 1, 1905.

Witnesses

Alva L. Goodknight, Inventor by C. A. Snow & Co.
Attorneys

UNITED STATES PATENT OFFICE.

ALVA L. GOODKNIGHT, OF COUNCIL BLUFFS, IOWA, ASSIGNOR OF ONE-HALF TO JOHN P. CRICK, OF LEAD, SOUTH DAKOTA.

AIR-BRAKE MECHANISM.

No. 800,736.      Specification of Letters Patent.      Patented Oct. 3, 1905.

Application filed February 1, 1905. Serial No. 243,725.

*To all whom it may concern:*

Be it known that I, ALVA L. GOODKNIGHT, a citizen of the United States, residing at Council Bluffs, in the county of Pottawattamie and State of Iowa, have invented a new and useful Air-Brake Mechanism, of which the following is a specification.

This invention relates to automatic air-brake mechanism, and has for its principal object to materially simplify and improve the construction of the working parts, so that there is less liability of wear and danger of sticking of any of the movable parts and in which the operation under all circumstances will be certain and positive.

A further object of the invention is to provide an air-brake mechanism in which on a service application, or rather on a number of service applications, the pressure in the brake-cylinder may be raised approximately to the train-pipe pressure, thus securing one of the advantages of a straight air system.

A still further object of the invention is to provide an air-brake mechanism in which a number of successive service applications may be had or in which an emergency application may follow a service application.

A still further object of the invention is to provide an air-brake mechanism in which one or more of the rear brakes of a train may be released in advance of the brakes at the head of the train, thus preventing the parting of the train, which at times occurs in ordinary systems where the head brakes are released first and the cars start ahead while the brakes are still set at the rear end of the train.

A still further object of the invention is to provide an air-brake mechanism in which the auxiliary reservoir may be recharged after either graduated or emergency reductions, while still holding all of the pressure in the brake-cylinder, thus rendering it unnecessary to move the brakes to full release for recharging.

A still further object of the invention is to provide air-brake mechanism in which on an emergency reduction the train-pipe will be placed in direct communication with the brake-cylinder and the two volumes of air, one from the train-pipe and the other from the auxiliary reservoir, serving to rapidly and effectively apply the brakes under high pressure.

A still further object of the invention is to provide an air-brake mechanism which may be readily employed in connection with draft-rigging and other mechanism now in use by simply removing the ordinary triple valve and replacing it by the device forming the subject of the present invention.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings.

Similar numerals of reference are employed to indicate corresponding parts throughout the several figures of the drawings.

The auxiliary reservoir 10, brake-cylinder 11, and train-pipe connection 12 are all of the usual character and may be of the standard construction. Secured to and communicating with the auxiliary reservoir is a cylindrical casing 13, that is provided with a transversely-disposed partition 14, in which are formed air-passages 15 and a graduating or service port 16, that leads from the left of the partition to a chamber 17, that is in communication with the brake-cylinder connection 11. This casing is provided with a bushing 18, on which fits a main piston 19, that is provided with a steel packing-ring 20. Within the bushing is arranged a secondary stationary cylinder 21, having a service piston-valve 22, connected by a stem 23 to the piston 19 and also provided with a suitable packing. The end of the stem 23, which projects beyond the end of the service piston-valve 22, terminates in a rounded valve 24, that is adapted to seat against the mouth of port 16 and close the same when the parts are in the release position. (Shown in Fig. 1.) In the annular flange or ring that connects the inner cylinder 21 with the outer cylinder or bushing is formed a port or ports 25, so that the air passing through the feed-groove 26 may freely flow through to the auxiliary reservoir, and in cylinder 21 is a port 27, so disposed that when the parts are in release position it will be out of communication with the service-port 16.

At the left-hand end of the casing 13 is a perforated partition 29, that divides said casing from a cylinder-casing 30, having a suitable bushing 31, in which fits an emergency-valve 32, that is provided with a plurality of passages 33, so that the air-pressure may equalize on both sides of the valve. This valve carries a rubber seat 34, that normally fits against a seat 35 at the mouth of a port 36, which leads through the partition 29 and communicates with a chamber 37, that is separated from chamber 17 by a partition 38. In this partition is a port 39, that is closed by a check-valve 40, the check-valve being maintained in closed position by a suitable spring 41 and being further exposed to brake-cylinder pressure while the brakes are set. These parts, which only come into operation during an emergency application, will be more fully described hereinafter.

At the train-pipe connection is the usual strainer 43 and drip-chamber 44, having a removable cleaning-plug 45, and leading from the drip-chamber is a port 46, that communicates with the cylinder 30 at a point between the valve 32 and the partition 29.

When the parts are in release position and the engineer's brake-valve in running position, air passes from the train-pipe through the drip-chamber, port 46, cylinder 30 to the perforated partition 29, casing 13, feeding-groove 26, passages 25 and 15 to the auxiliary reservoir until the latter is filled with air under a pressure equal to that of the train-pipe.

For a graduated or service stop the engineer's brake-valve is operated in the usual manner, and train-pipe pressure is gradually reduced, causing the piston 19 to travel to the left under the superior pressure of the auxiliary reservoir. This position is shown in Fig. 2, and it will be observed that the piston 19 has passed beyond the leakage or feed groove and cut off communication between the train-pipe and the auxiliary reservoir. The piston-valve 22 has been moved beyond the port 27 and has opened the port 16, so that auxiliary-reservoir pressure will equalize through passage 15, port 27, cylinder 21, port 16 to chamber 17 and brake-cylinder connection 11, the brakes being applied with a degree of force corresponding approximately to the extent of train-pipe reduction. The engineer's valve is immediately placed on lap, and thence moved to running position if it be desired to recharge the auxiliary reservoir. The reduction of auxiliary-reservoir pressure due to the equalization in the brake-cylinder soon results in a preponderance of pressure in the train-pipe, and this pressure acting on the left of the piston 19 moves the latter again to the position shown in Fig. 1, opening the leakage or feed groove 26 and closing the port 16, so that air from the train-pipe may again pass to the auxiliary reservoir for the purpose of renewing the supply and holding the volume of air under full pressure in readiness for another application, either graduated or emergency, as may be desired, and this occurs without the necessity of releasing the brakes, the pressure being still retained in the brake-cylinder through the action of mechanism hereinafter described.

Figure 1:
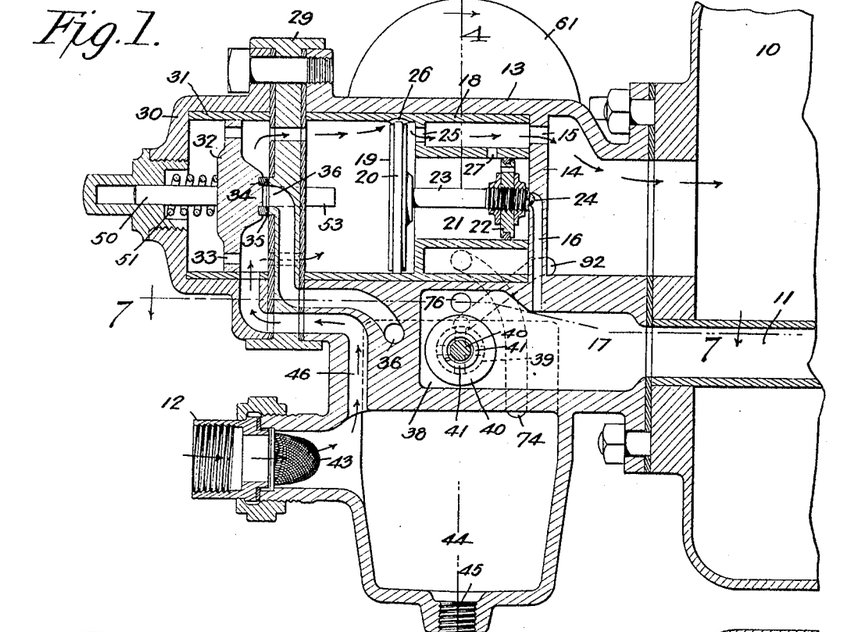
Figure 1 is a sectional elevation of an air-brake mechanism constructed in accordance with the invention, the section being on a plane indicated by the line 1 1 of Fig. 4 and the parts being shown in the normal or release position with the train-pipe in communication with the auxiliary reservoir.
Figure 2:
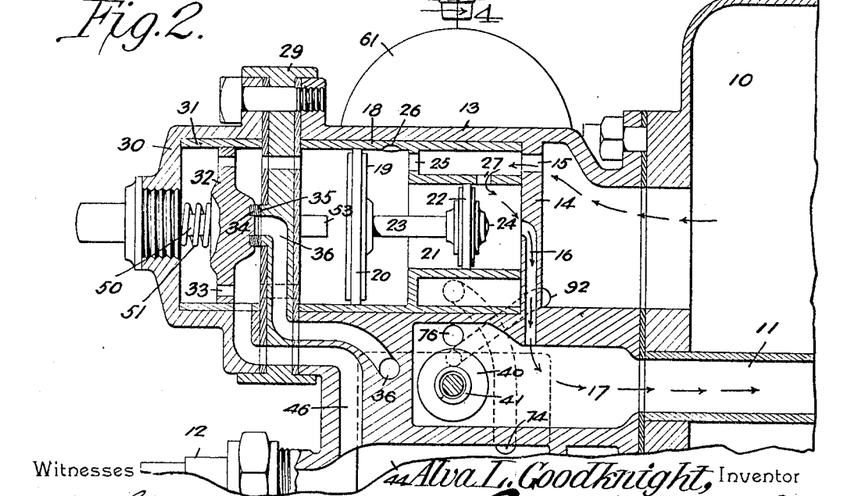
Fig. 2 is a similar view showing the parts in the position assumed on a service reduction.
Figure 3:
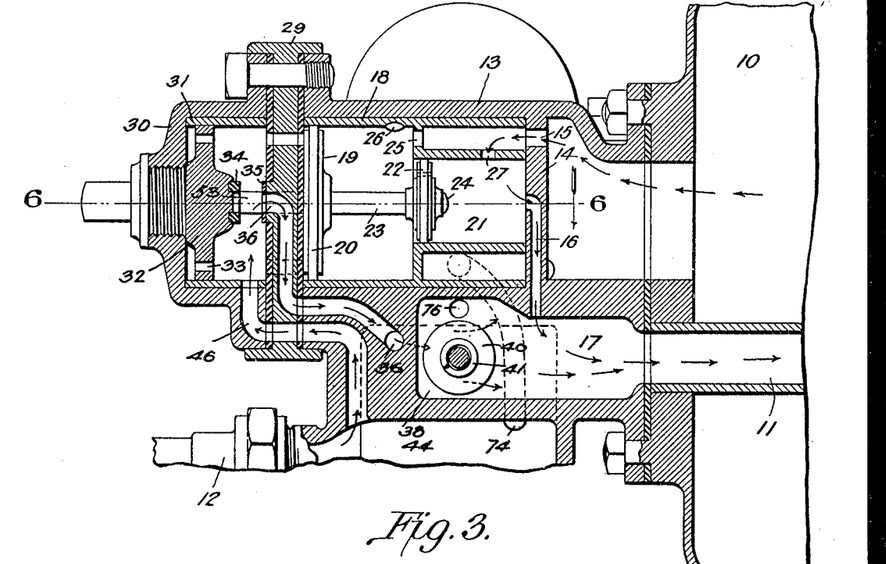
Fig. 3 illustrates the positions assumed by the parts on an emergency reduction.
Figure 6:
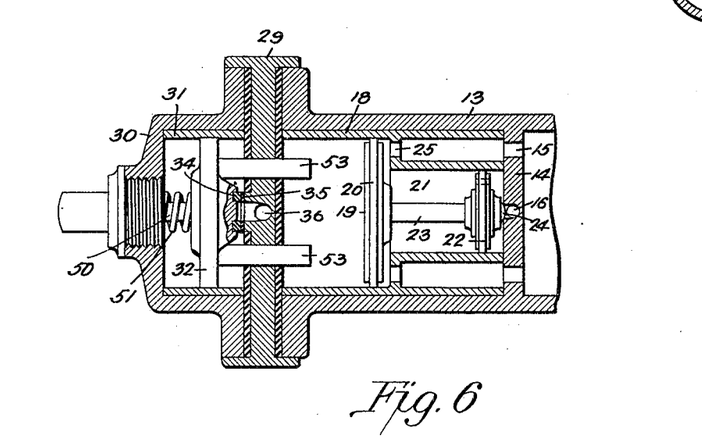
Fig. 6 is a sectional plan view of a portion of the mechanism on the line 6 6 of Fig. 3.

Before describing the slide-valve or pressure-retaining means reference is had to Figs. 1 and 6, showing the construction of the emergency-valve. This valve is provided with a stem 50, fitting in a suitable opening formed in the plug at the end of the cylinder 30, and surrounding the stem is a spring 51 of the same general type as the graduating spring of an ordinary triple valve and serving as a means for holding the emergency-valve to its seat 35. This valve carries a pair of projecting pins 53, that extend through guiding-openings in the partition 29 and are disposed in the path of movement of the main piston 19, so that if the latter is moved to the left more rapidly than that required for a service stop it will strike the stems with force enough to overcome the tension of the spring and unseat the emergency-valve for an emergency application of the brakes. The pressure in the train-pipe is reduced very suddenly and the main piston 19 will move rapidly to the left end under superior auxiliary-reservoir pressure and striking against the stems 53 will move the emergency-valve to the position shown in Fig. 3, and at the same time piston-valve 22 will be moved beyond the port 27 and valve 24 will uncover the port 16. As the result of this the comparatively large area of the ports 46 and 36 will allow air to pass rapidly from the train-pipe to chamber 37, where it acts on the check-valve 40, opening the latter and passing into chamber 17, and from thence to the brake-cylinder connection 11 until the train-pipe pressure becomes slightly less than the brake-cylinder pressure. The latter, becoming greater than the former, forces the check-valve 40 to its seat again and closes the communication. At the same time air flows from the auxiliary reservoir to the chamber 17 in the same manner as for a service application, and the two volumes of air combine together and fill the brake-cylinder very suddenly and effect a rapid and more powerful direct application of the brakes. The operation is effected very quickly, and when the release is necessary it is accomplished in the usual manner by placing the engineer's valve-handle in full-release position. The immediate preponderance of pressure in the train-pipe resulting therefrom will again move the piston 19 to the right until seated, thus opening up the feed-groove 26 and closing communication between the ports 16 and 27. Air also passes through the ports 33 to the back of valve 32 to the closed end of the cylinder 30 and assists the spring 51, thereupon forcing the valve to its seat and closing communication between the ports 46 and 36.

Figures 5, 11:
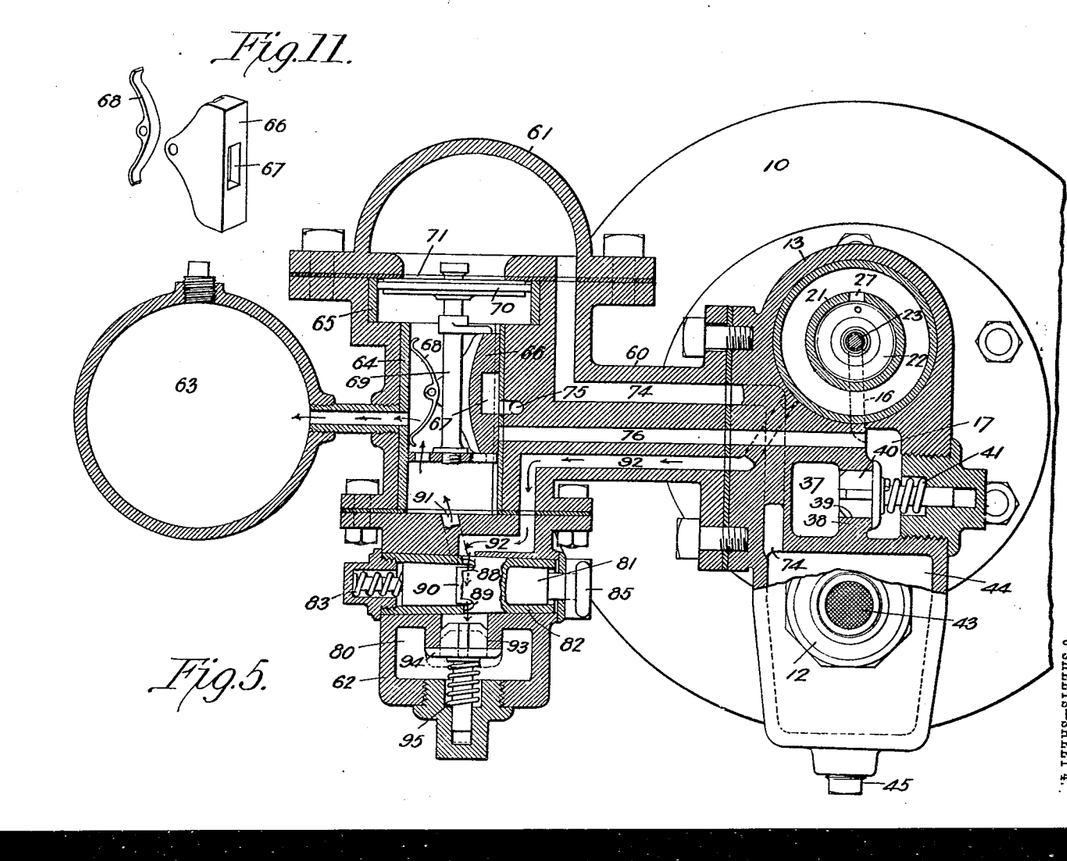
Fig. 5 is a similar view showing the position of the parts when the brakes are set on either an emergency or a service reduction.
Fig. 11 is a detail perspective view of the brake-cylinder exhaust-valve detached.
Figures 7, 8, 9:
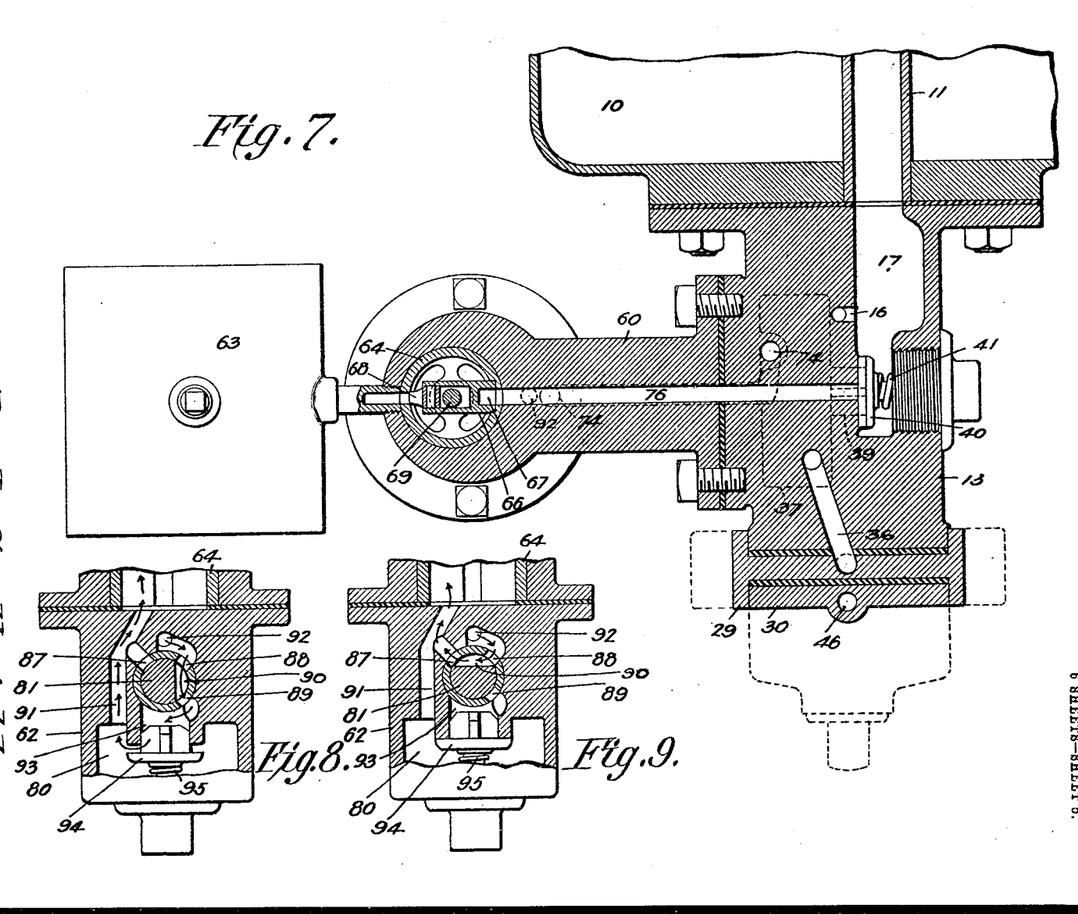
Fig. 7 is a sectional plan view of the mechanism on the line 7 7 of Fig. 1.
Fig. 8 is a detail sectional view on the line 8 8 of Fig. 4 of the valve which controls the degree of train-pipe pressure necessary to release the brakes, the adjustment being such that the brakes can only move under high pressure — in other words, full normal train-pipe pressure.
Fig. 9 is a similar view of the same parts, showing the adjustment of the valve for release.
Figure 10:
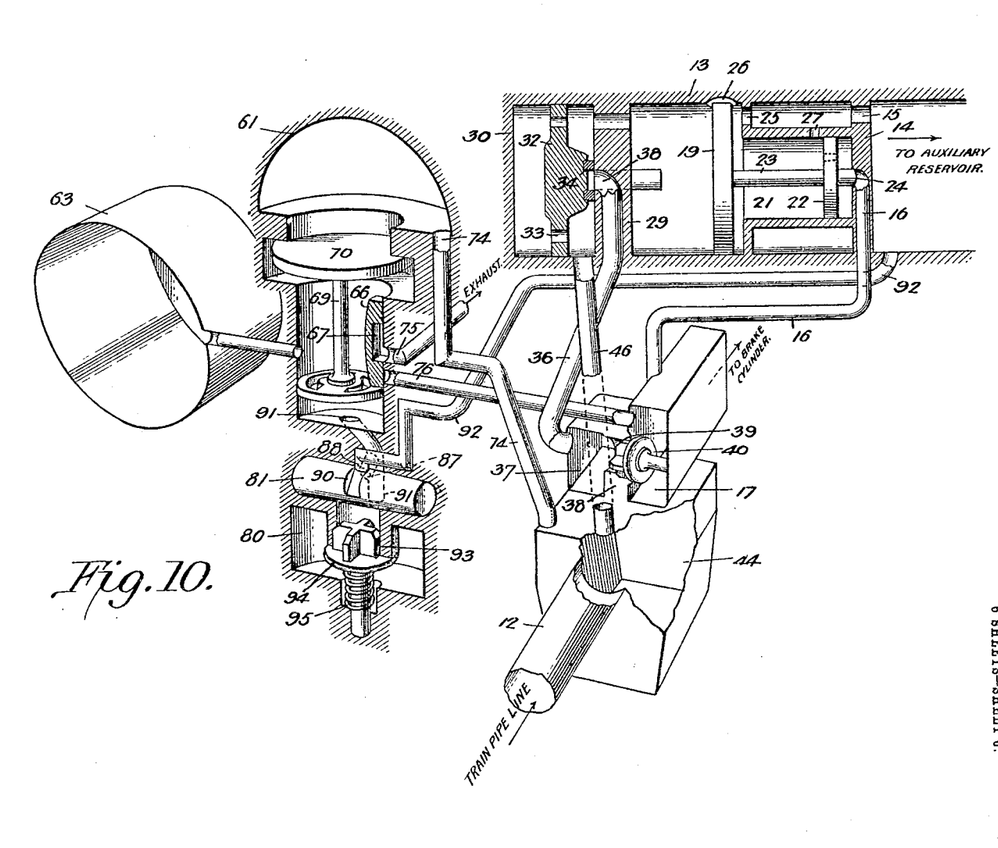
Fig. 10 is a perspective view illustrating in diagrammatic form the relation of the parts.

Should it be desired to recharge the auxiliary reservoir while descending heavy grades without releasing the brake upon a car, it is necessary to place valve 81 with the handle 85 up in a right-angle position, as shown in Figs. 5 and 8. The pressure is still retained in the brake-cylinder, and the auxiliary-reservoir supply is again renewed by the train-pipe in the usual manner.

One of the principal advantages gained with a separate means for controlling the exhaust of the brake-cylinder is that after a service application of, say, ten pounds, with a train-pipe pressure of seventy pounds and auxiliary-reservoir pressure of seventy pounds or less, is that after the reduction of the auxiliary reservoir due to this first ten-pound application the parts are restored to the position shown in Fig. 1 and the auxiliary reservoir is again charged up to its normal pressure, and then by again reducing the train-pipe pressure a second service application may be had, still retaining the first pressure of ten pounds, and with a second application the pressure in the brake-cylinder may be raised to, say, twenty-five pounds, after which the parts are again restored to the position shown in Fig. 1, retaining twenty-five pounds of brake-cylinder pressure. The auxiliary reservoir is again charged and the third or fourth application may be made, so that, if necessary, the brake-cylinder pressure may be brought up by successive service applications to approximately the pressure of the auxiliary reservoir—say from sixty-five to seventy pounds. It will also be observed that after a service application and while still retaining the pressure therefrom in the brake-cylinder an emergency application may be made, and with the brake-cylinder suddenly filled the train will be brought to a stop very rapidly.

Figure 4:
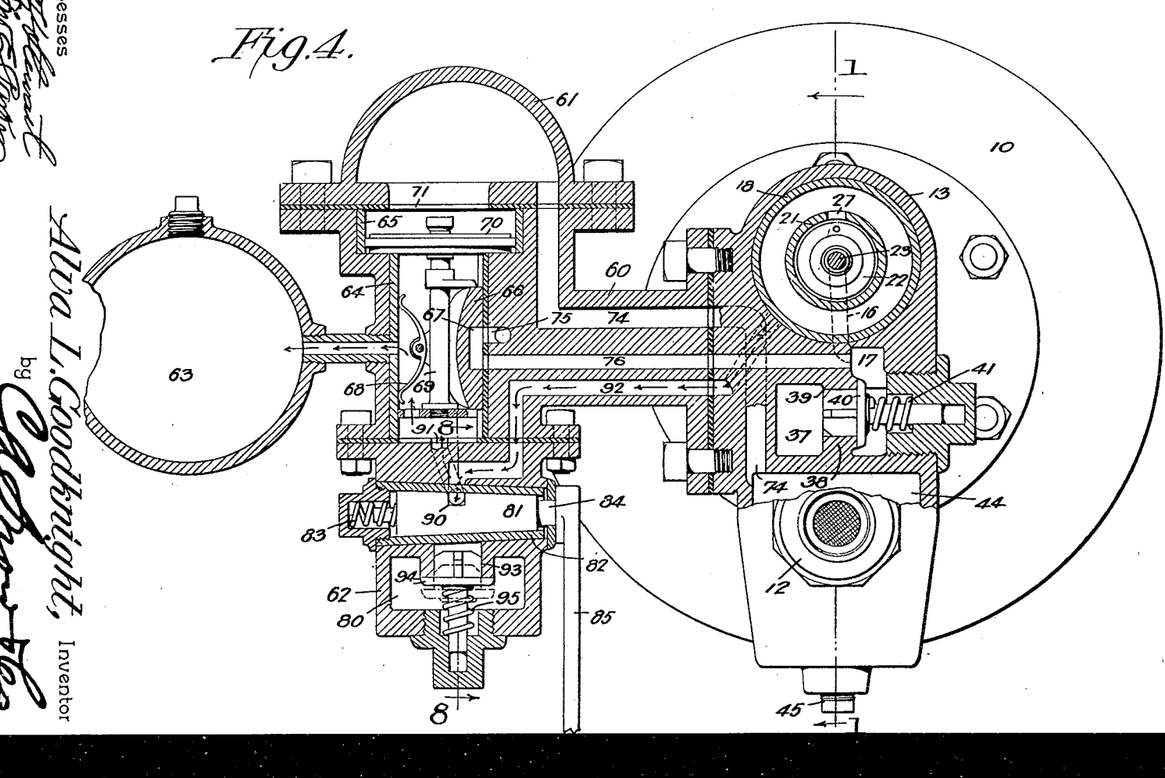
Fig. 4 is a sectional plan view on the line 4 4 of Fig. 1 with the parts in release position.

The slide-valve or mechanism for controlling the pressure in the brake-cylinder is shown more clearly in Figs. 4 and 5 and operate at the same time as the triple. When a reduction of train-pipe pressure is made for applying the brake, it accomplishes the same and greater results than other slide-valves in use. The usual retaining-valve at the top of the car is entirely dispensed with, it being unnecessary to employ them, as the engineer is given entire control of the brakes without depending upon trainmen to assist with retainers and hand-brakes while descending heavy grades. This general mechanism is contained within a casing formed in three sections 60, 61, and 62, that are provided with bolt-flanges, the section 60 being bolted to the main casing of the valve mechanism previously described. At one side of and connected to the section 60 of the casing is a second pressure-retaining reservoir 63, that is supplied by the train-pipe through the auxiliary reservoir and may constitute a reservoir for operating the slide-valve and piston to control the release of the brake or recharging the auxiliary reservoir while the brakes are applied by so connecting the secondary reservoir and the auxiliary reservoir as not to reduce the pressure in the secondary reservoir when the brakes are applied. Said secondary-reservoir pressure may be utilized in this manner for the purpose of preventing the release of the brakes, except under full-release pressure against the upper side of the slide-valve piston. The section 60 of the casing contains a cylinder having two bores of unequal diameter—one containing a bushing 64 and the other a bushing 65—and the smaller bushing 64 is cut away to form a seat for a slide-valve 66, having a recess or port 67, the valve to some extent corresponding to the main slide of the triple valves now in use. In so far as it governs the exhaust from the brake-cylinder this valve is held to its seat by a leaf-spring 68 and is connected by a stem 69 to a slide-valve piston 70, that is arranged within the bushing 65, and said piston is exposed on one side to pressure from the secondary reservoir 63, which tends to seat it against the rubber gasket 71 when the pressure is greater than that on the opposite side, which is exposed to the train-pipe pressure in the section 61 of the casing, this section communicating with the drain-cup through a large port 74, so that it is always exposed to train-pipe pressure.

In the valve-seat of bushing 64 are two ports 75 and 76, the port 75 leading to the atmosphere and the port 76 leading to the chamber 17. If air under full-release pressure is sent through the train-pipe, it will act on the piston 70 and move the latter from the position shown in Fig. 5 to that shown in Fig. 4, thus placing the brake-cylinder connection and chamber 17 in communication with port 76, port 67, and the slide-valve and exhaust-port 75, allowing the brake-cylinder pressure to exhaust to the atmosphere and release the brake. On the other hand, if the pressure in the secondary reservoir 63 is greater than that in the train-pipe the piston 70 will be moved to the position shown in Fig. 5 and the port 76 leading from the brake-cylinder will be blanked, thus retaining the pressure in the brake-cylinder.

In the lower section 62 of the casing is a chamber 80, and above this is a valve 81, preferably in the form of a tapered plug and held tightly within the bushing 82 by means of a helical compression-spring 83. The smaller end of the valve is provided with a stem 84, carrying an operating-handle 85, which is moved to either a vertical or horizontal position in accordance with the purpose for which the air-pressure in the secondary reservoir 63 is to be utilized.

On reference to Figs. 8 and 9 it will be observed that the bushing is provided with three ports 87, 88, and 89 and that the valve has a single port 90. The port 87 communicates with a vertically-disposed passage 91, leading from the lower chamber 80 to the exterior of the bushing 82 through to the interior of the bushing 64. Referring to Figs. 4 and 8, the port 88 is in communication with a passage 92, that leads through the several ports of the casing to the interior of the main casing 13 at a point adjacent to the auxiliary-reservoir connection. The port 89 terminates within the chamber 80 in an annular valve-seat 93, on which a check-valve 94 is seated by a spring 95, the valve closing upwardly under the stress of the spring and pressure of air from the secondary reservoir 63, and after the pressure becomes equalized in both reservoirs said valve seats and prevents any back flow of air from the secondary reservoir through the valve-ports and port 92 to the auxiliary reservoir when applying the brake. During the recharging of the auxiliary reservoir air will pass from the latter through the port or passage 92, port 88, port 89, opening the check-valve 94 and passing up through the passage 91 to the interior of the bushing 64 and thence to the secondary reservoir 63 until the pressures in both reservoirs have become equalized. If the brake should be applied, it forces the piston 70 to the position shown in Fig. 5, thus preventing any possibility of air-pressure escaping from the brake-cylinder to the atmosphere. At the same time any back flow of air from the secondary to the auxiliary reservoir is prevented by the check-valve 94, and as piston 70 is therefore subjected at all times to the full train-pipe pressure, except when reduced by minor leakage, the piston 70 cannot be moved to the position shown in Fig. 4 except under full-release pressure sent through the train-pipe, this pressure approximately being ninety pounds maintained in the main reservoir. Where a seventy-pound normal train-pipe pressure is used throughout the train-line, should the valve 81 be moved to the position shown in Fig. 9, the air, as indicated by arrows, entering through the port 92 from the auxiliary reservoir, will pass through port 88, port 90, port 87 to port 91 to the interior of the bushing 64 and secondary reservoir 63, charging the latter, as before, until the pressure becomes equal in both reservoirs. Any reduction of train-pipe pressure in chamber 61 on the upper side of piston 70 will establish a superior pressure on the lower side in the secondary reservoir and force the piston to the position shown in Fig. 5 and blank the exhaust-port of the brake-cylinder. This occurs at the same time the triple piston moves out the first time in order to admit auxiliary air-pressure into the brake-cylinder, as it aids in reinforcing the pressure by equalizing the auxiliary reservoir, will not permit movement of the piston 70 to release position owing to the friction of the slide-valve 66. This permits the triple piston to move back again and open up the feed-groove, owing to it having no slide-valve resistance, and allows equalization of the auxiliary-reservoir and train-pipe pressures without affecting the position of the piston 70, owing in part to the friction of the slide-valve and in part to the fact that as soon as equalization of the auxiliary reservoir commences the equalization of the pressure of the secondary reservoir 63 also commences, so that the pressure on both sides of the piston 70 and triple piston 19 will be the same, thus permitting an emergency application after the brake has been applied with a service reduction. The fact remains, however, that it is easier to move the piston 70 when valve 81 is in the position shown in Figs. 4 and 9 than when valve 81 is in the position shown in Figs. 5 and 8, for the reason that when full-release pressure is exerted on piston 70 it must displace the air within the bushing 64, and there is a passage leading from bushing 64 directly through port 91, port 87, port 90, port 92 to the casing 13 when the parts are in the position shown in Figs. 4 and 9; but when in the position shown in Figs. 5 and 8 this passage terminates at the check-valve 94, and it is more difficult to move the piston 70, and thus adjust the valve 66 to release position. This is taken advantage of, especially in long trains, in effecting the release of the rear brakes in advance of the release of the head-brakes.

It is a well-known fact that with ordinary triple-valve mechanism the movement of the engineer's brake-valve to full release will act first on the cars at the front of the train and release the brakes, while the brakes at the rear of the train, especially if the train is a long one, will continue set for an appreciable period of time. If a train is running even at very slow speed, the forward cars will start ahead, and then the rear cars having their brakes set will lag behind, and if there is a weak draw-bar or coupling-head the train will part and in many cases result in serious accident.

By the employment of devices constructed in accordance with the present invention the air-brake mechanism of the cars at the head of the train have their valves 81 adjusted to the position shown in Figs. 5 and 8 and those at the rear of the train adjusted to the position shown in Figs. 4 and 9. As soon, therefore, as the engineer sends full-release pressure through the pipe there will be a nearly uniform release, inasmuch as it requires less pressure at the rear portion than at the front of the train to release the brakes.

It is found that by dispensing with the slide-valve, and especially a spring-pressed slide-valve, in the triple valve and casing all danger of sticking is avoided. It is well known that with an ordinary triple valve the valve will sometimes stick under pressure of its spring or when gummy and will not move on the first or second graduated application, and if the engineer apply a second or third graduated application the train-pipe reduction is often sufficient to permit the auxiliary-reservoir pressure to instantly force the valve back to the emergency position and apply the brakes on one or all of the cars in emergency instead of service application, resulting in severe strain and in many cases breakage of the running-gear and cars. By arranging the mechanism as herein described all slide-valves for the control of the supply of pressure to the brake-cylinder are dispensed with, and the movement is certain and positive under all conditions.

The only point where sticking of a slide-valve could occur is in the governing device, where the slide-valve 66 may possibly stick; but this would not in any manner affect the application of the brakes in emergency, the only result being a flowing through of a portion of the air from the brake-cylinder connection through port 76, port 67, port 75 to the atmosphere, and this defect could be instantly located by the hissing sound as the air issues from the port.

Having thus described the invention, what is claimed is—

1. In air-brake mechanism, a valve-casing, a main piston arranged therein and exposed on one side to the train-pipe pressure, and on the opposite side to auxiliary-reservoir pressure, a ported cylinder arranged within the valve-casing, a piston-valve arranged in the cylinder and connected to the main piston, a port leading from the cylinder to the brake-cylinder, and a second valve connected to the piston and adapted to close said port.

2. In air-brake mechanism, a valve-casing, a pair of cylinders of unequal area arranged within the casing, a main piston in the larger cylinder and exposed on one side to the train-pipe pressure and on the opposite side to auxiliary-reservoir pressure, a piston-valve in the smaller cylinder, a stem connecting the piston to the piston-valve and provided at one end with a direct-seating valve, a port for placing the smaller cylinder in communication with the auxiliary reservoir, and a port leading between the smaller cylinder and the brake-cylinder and normally closed by said direct-seating valve.

3. In air-brake mechanism, a valve-casing, a pair of concentric cylinders arranged therein and in communication with each other and with the auxiliary reservoir, a main piston disposed in the larger cylinder and exposed on one side to train-pipe pressure, a piston-valve arranged in the smaller cylinder, a stem connecting the piston and piston-valve and provided at one end with a direct-seating valve, and a port or passage leading between the smaller cylinder and the brake-cylinder and normally closed by said direct-seating valve.

4. In air-brake mechanism, a valve-casing, a pair of concentric cylinders arranged therein and communicating with each other, a ported partition forming one end of both cylinders and provided with passages to establish communication between the outer cylinder and the auxiliary reservoir, the port of said partition leading between the inner cylinder and the brake-cylinder, a main piston arranged in the outer cylinder and exposed on one side to auxiliary-reservoir pressure, and on the opposite side to train-pipe pressure, a piston-valve arranged in the inner cylinder, and a stem connecting the piston and valve and provided at one end with a second valve that normally closes the port in said partition.

5. In air-brake mechanism, a single piston exposed on one side to train-pipe pressure and on the other side to auxiliary-reservoir pressure, a valve connected to the piston and movable on all reductions of train-pipe pressure to establish communication between the auxiliary reservoir and the brake-cylinder, and an emergency-valve operable by the piston only on emergency reductions and serving to establish direct communication between the train-pipe and the brake-cylinder.

6. In air-brake mechanism, a single piston exposed on one side to train-pipe pressure, and on the opposite side to auxiliary-reservoir pressure, a valve connected to the piston and movable on both emergency and service reductions of train-pipe pressure to place the auxiliary reservoir in communication with the brake-cylinder, and a normally seated emergency-valve having pins or projections extending into the path of movement of the piston, and with which the latter engages to unseat the emergency-valve on an emergency reduction and establish communication between the train-pipe and the brake-cylinder.

7. In air-brake mechanism, a casing having a pair of ported partitions, both ports or passages leading from the casing to the brake-cylinder, valves normally closing said ports, a cylinder, a piston arranged in the cylinder and exposed on one side to train-pipe pressure, and on the opposite side to auxiliary-reservoir pressure, said piston being directly connected to one of the valves and being movable on an emergency reduction to unseat the other valve.

8. In air-brake mechanism, a casing including a cylinder having a ported partition at each end, one of said ports when opened establishing communication between the auxiliary reservoir, the cylinder and the brake-cylinder, and the other of said ports when opened establishing communication between the train-pipe and the brake-cylinder, valves normally closing said ports, and a single piston disposed within the cylinder and directly connected to one of said valves, said piston being movable on an emergency reduction to unseat the second valve.

9. In air-brake mechanism, a casing divided by a pair of ported partitions into a central cylinder and end chambers, one of said end chambers communicating with the auxiliary reservoir, and the other with the train-pipe, a port arranged in one partition and leading from the cylinder side thereof to the brake-cylinder, a port arranged in the second partition and leading from the train-pipe side thereof to the brake-cylinder, a check-valve disposed in the latter port and opening under train-pipe pressure in the direction of the brake-cylinder, valves normally closing said ports, and a single piston directly connected to one of the valves for controlling communication between the auxiliary reservoir and the brake-cylinder and movable to unseat the second valve on an emergency reduction, and thereby place the train-pipe in communication with the brake-cylinder.

10. In air-brake mechanism, the combination with a casing, of a pair of ported partitions dividing the casing into three compartments including a central cylinder and two end chambers, one of which communicates with the auxiliary reservoir, and the other with the train-pipe, a second ported cylinder arranged within the first, a port leading through one of the partitions from the inner cylinder to the brake-cylinder, a direct-seating valve for closing said port, a stem carrying the valve, a piston-valve mounted on the stem and arranged within the smaller cylinder, a main piston disposed in the larger cylinder and connected to the valve, an emergency-port leading from the train-pipe side of the second partition to the brake-cylinder, a check-valve arranged in the emergency-port and opening in the direction of the brake-cylinder under train-pipe pressure, a spring-seated valve normally closing the emergency-port, said valve being provided with openings to permit equalization of pressure on its opposite sides, and pins extending from the valve through the second partition and into the path of movement of the main piston.

11. In air-brake mechanisms, an auxiliary reservoir, a secondary reservoir, means for placing both reservoirs in communication with the train-pipe, and a manually-adjustable valve controlling communication between the two reservoirs whereby the pressures of one or both may be utilized in applying the brakes, said valve serving in all positions of adjustment to permit recharging of both reservoirs.

12. In air-brake mechanism, an auxiliary reservoir, means for controlling the flow of air between the train-pipe and the auxiliary reservoir, and between the auxiliary reservoir and the brake-cylinder, a secondary reservoir, a casing having a passage for placing the two reservoirs in communication with each other, a check-valve in said passage, and a ported valve movable to direct the air either through or around said check-valve.

13. In air-brake mechanism, a brake-cylinder exhaust-valve, a piston connected thereto and exposed on one side to train-pipe pressure, and means on the opposite side for varying the resistance offered to the movement of the piston to valve-opening position.

14. In air-brake mechanism, the brake-cylinder exhaust-valve, a piston connected thereto and exposed on one side to train-pipe pressure, and on the opposite side to the pressure of a volume of air, and means for adjusting the resistance offered by such volume of air to valve-opening movement of the piston.

15. In air-brake mechanism, separate valves for controlling, respectively, the flow of air from the auxiliary reservoir to the brake-cylinder, and the exhaust of air from the brake-cylinder, both of said valves being movable under variations in train-pipe and auxiliary-reservoir pressures, the exhaust-valve being arranged to offer greater resistance to movement than the brake-applying valve and being retained in closed position during return movement of said brake-applying valve and the recharging of the auxiliary reservoir.

16. In air-brake mechanism, two valves, one controlling the flow of air from the auxiliary reservoir to the brake-cylinder and movable to permit recharging of the auxiliary reservoir while the brakes are set, the other valve controlling the exhaust of air from the brake-cylinder, the exhaust-valve being arranged to offer greater resistance to movement than the first valve.

17. In air-brake mechanism, independent brake-applying and brake-exhaust valves, pistons connected to the valves, both of said pistons being exposed on one side to train-pipe pressure and on the opposite side to auxiliary-reservoir pressure, the exhaust-valve being arranged to offer greater resistance to movement than the brake-applying valve, and means for adjusting the auxiliary-reservoir pressure acting on the piston of the exhaust-valve to resist movement of the latter under train-pipe pressure.

18. In air-brake mechanism, independent brake-applying and brake-exhaust valves, pistons connected to the valves, both of said pistons being exposed on one side to train-pipe pressure, and on the opposite side to auxiliary-reservoir pressure, and means for adjusting the resistance offered by the exhaust-valve to the movement to exhaust position.

19. In air-brake mechanism, a pair of valves arranged, respectively, in separate chambers, pistons connected to the valves and each exposed on one side to train-pipe pressure, and on the opposite side to auxiliary-reservoir pressure, and means for retaining the full auxiliary pressure on the piston of the exhaust-valve during and after the application of the brakes and the reduction of auxiliary-reservoir pressure on the piston of the other valve.

20. In air-brake mechanism, a cylinder having ports leading, respectively, to the brake-cylinder and the atmosphere, a slide-valve arranged in the cylinder and controlling said ports, a piston connected to the valve and exposed on one side to train-pipe pressure, a secondary reservoir connected to the cylinder, means for placing the cylinder in communication with the auxiliary reservoir, and a check-valve for preventing backflow of air from the secondary reservoir to the auxiliary reservoir, whereby the full pressure of the secondary reservoir may be retained on said piston while the auxiliary-reservoir pressure equalizes on the brake-cylinder.

In testimony that I claim the foregoing as my own I have hereto affixed my signature in the presence of two witnesses.

ALVA L. GOODKNIGHT.

Witnesses:
W. J. DILLON,
J. H. JOCHUM, Jr.